United States Patent [19]

Dickie et al.

[11] Patent Number: 4,471,060

[45] Date of Patent: Sep. 11, 1984

[54] METHOD OF FORMING A RELATIVELY STABLE SLIP OF SILICON METAL PARTICLES AND YTTRIUM CONTAINING PARTICLES

[75] Inventors: Ray A. Dickie, Birmingham; John A. Mangels, Flat Rock, both of Mich.

[73] Assignee: Ford Motor Company, Dearborn, Mich.

[21] Appl. No.: 512,095

[22] Filed: Jul. 8, 1983

[51] Int. Cl.³ .................. C04B 35/58; C04B 35/65
[52] U.S. Cl. .................. 501/151; 264/86; 501/98; 501/152; 501/154
[58] Field of Search .................. 264/86; 501/151, 152, 501/154, 98, 97

[56] References Cited

U.S. PATENT DOCUMENTS 4,120,734 10/1978 Taniguchi .................. 501/131
4,268,466 5/1981 Ezis .................. 264/86
4,285,895 8/1981 Mangels et al. .................. 501/98
4,410,636 10/1983 Minjolle .................. 501/98

FOREIGN PATENT DOCUMENTS 779474 7/1957 United Kingdom .................. 264/86

Primary Examiner—Helen M. McCarthy
Attorney, Agent, or Firm—William E. Johnson; Olin B. Johnson

[57] ABSTRACT

The method concerns forming a relatively stable slip of silicon metal particles and yttrium containing particles. In one embodiment, a casting slip of silicon metal particles is formed in water. Particles of a yttrium containing sintering aid are added to the casting slip. The yttrium containing sintering aid is a compound which has at least some solubility in water to form $Y^{+3}$ ions which have a high potential for totally flocculating the silicon metal particles into a semiporous solid. A small amount of a fluoride salt is added to the casting slip which contains the yttrium containing sintering aid. The fluoride salt is one which will produce fluoride anions when dissolved in water. The small amount of the fluoride anions produced are effective to suppress the flocculation of the silicon metal particles by the $Y^{+3}$ ions so that all particles remain in suspension in the casting slip and the casting slip has both an increased shelf life and can be used to cast articles having a relatively thick cross-section. The pH of the casting slip is maintained in a range from 7.5 to 9. Preferably, the fluoride salt used is one which is based on a monovalent cation such as sodium or ammonia. The steps of adding the yttrium containing sintering aid and the fluoride salt may be interchanged if desired, and the salt may be added to a solution containing the sintering aid prior to addition of the silicon metal particles.

12 Claims, No Drawings

METHOD OF FORMING A RELATIVELY STABLE SLIP OF SILICON METAL PARTICLES AND YTTRIUM CONTAINING PARTICLES

STATEMENT

The invention herein described was made in the course of or under a contract or subcontract thereunder with NASA—Contract No. DEN3-167, Subcontract P1928150.

BACKGROUND ART AND PRIOR ART STATEMENT

No search was conducted on the subject matter of this specification in the U.S. Patent and Trademark Office or any other search facility. We, the inventors of the subject application, are unaware of any prior art which is relevant to the method of forming a relatively stable slip of silicon metal particles and yttrium containing particles as disclosed and claimed in this specification.

Silicon metal particles and yttrium containing particles have been mixed and formed into slips so that articles may be slip cast therefrom. The purpose of using silicon particles is that these particles may be subsequently nitrided in order to form silicon nitride, a ceramic material which has excellent thermal resistance properties. Yttrium is used in casting such articles because the yttrium serves as an excellent sintering aid in a sintering operation carried out on the formed article once the silicon particles have been transformed into silicon nitride. Thus, the order of progress is one in which an article is slip cast, the so-formed article being formed of silicon particles and yttrium containing particles. The so-formed article is then subjected to a nitriding operation in which the silicon particles are transformed into silicon nitride. Thereafter, the nitrided article is subjected to a sintering operation in which the yttrium acts as a sintering aid in permitting the silicon nitride particles to form into a uniformly high density silicon nitride article having excellent thermal resistance characteristics. The arts of slip casting, nitriding, and sintering are all well known in the art and no further discussion thereof will be contained herein.

The difficulty we have had in forming slips of silicon metal particles and yttrium containing particles comes about in that the slips generally have a relatively poor stability when slip cast as well as a relatively short shelf life. By poor stability we mean that the formed slip does not have uniform chemical and rheological stability for prolonged periods of time necessary to cast articles having some degree of thickness. In fact, we have found that slips of silicon metal particles and yttrium containing particles are relatively unstable and generally have a very short period of time in which they may be slip cast, the time in some instances being only one-half hour to one hour. In most cases a minimum of 4-8 hours of a stable slip is required in order to cast that slip in a slip casting process to form an acceptable slip cast part. By poor shelf life we mean that chemical properties of the slip change as the slip sits on a shelf between times of using the slip in a casting operation.

In general, the yttrium containing particles forming the yttrium containing sintering aid are formed from a compound which has at least some solubility in water to form $Y^{+3}$ ions. These $Y^{+3}$ ions have a high potential for totally flocculating the silicon metal particles into a semiporous solid. Thus, in a situation where yttrium containing particles are mixed with silicon metal particles to form a slip, the yttrium containing particles normally dissolve in water to form the $Y^{+3}$ ions. Once a significant number of these ions have formed, the ions are effective to totally flocculate the silicon metal particles into a semiporous solid which in effect sets up the material which is to be used as the casting slip and thereby ends the castability of that slip. The concentration of the yttrium containing particles in the slip determines the amount of time before the flocculation of the silicon particles takes place. In any regard, the flocculation of slip compositions we use containing silicon metal particles and yttrium containing particles usually occurs within one-half to one hour after that slip has been cast into a mold. This time is too short of a time to cast an article having other than a very small thickness dimension.

It is therefore a principal object of the method of this invention to form a relatively stable slip of silicon metal particles and yttrium containing particles, which slip has both an increased shelf life and a casting time which permits the casting of this slip into articles of relatively thick dimension.

DISCLOSURE OF THE INVENTION

This invention is directed to a method of forming a relatively stable slip of silicon metal particles and yttrium containing particles.

In accordance with one embodiment of the method of this invention, the method is characterized by the following steps.

A casting slip of silicon metal particles is formed in water.

Particles of a yttrium containing sintering aid are added to the casting slip. The yttrium containing sintering aid is a compound which has at least some solubility in water to form $Y^{+3}$ ions which have a high potential for totally flocculating the silicon metal particles into a semiporous solid.

A small amount of a fluoride salt is added to the casting slip which contains the yttrium containing sintering aid. The fluoride salt is one which will produce fluoride anions when dissolved in water. The small amount of the fluoride anions renders $Y^{+3}$ ions ineffective in flocculating the silicon metal particles. In this manner the silicon metal particles as well as the particles of the yttrium containing sintering aid remain in suspension in the casting slip, whereby the casting slip has both an increased shelf life and can be used to cast relatively thick sections of an article. The pH of the casting slip is maintained in a range from 7.5 to 9.

In accordance with a preferred but not limiting embodiment of the method of this invention, the fluoride salt used in the method is one based on a monovalent cation such as sodium or ammonium fluoride.

In accordance with the teachings of another embodiment of the method of this invention for forming a relatively stable slip of silicon metal particles and yttrium containing particles, the method is characterized by the following steps.

A casting slip is formed of silicon metal particles in water. A small amount of a fluoride salt is added to the casting slip. The fluoride salt is one which will produce fluoride anions when dissolved in water.

A yttrium containing sintering aid is added to the fluoride anion containing casting slip. The yttrium containing sintering aid is a compound which has at least some solubility in water to form $Y^{+3}$ ions. The $Y^{+3}$ ions have a high potential for totally flocculating the silicon metal particles into a semiporous solid. However, the small amount of the fluoride anions renders $Y^{+3}$ ions ineffective in flocculating the silicon metal particles. In this manner the silicon metal particles as well as the particles of the yttrium containing sintering aid remain in suspension in the casting slip and the casting slip has both an increased shelf life and can be used in the casting of articles having a significantly thick cross-section. The pH of the casting slip is maintained in a range from 7.5 to 9.

Once again, a preferred but not limiting method of this invention is one in which the fluoride salt is one based on a monovalent cation such as sodium or ammonium fluoride.

BEST MODE AND INDUSTRIAL APPLICABILITY

The novel features that are considered characteristic of the invention are set forth with particularity in the appended claims. The invention itself, however, both as to its organization and method of operation, together with additional objects and advantages thereof, will best be understood from the following description of specific embodiments of the method of our invention.

The following description is what we consider to be preferred embodiments of our method of forming a relatively stable slip of silicon metal particles and yttrium containing particles. The following description also sets forth what we now contemplate to be the best mode of carrying out the method of this invention. This description is not intended to be a limitation upon the broad principles of the method of this invention which is to be disclosed hereinbelow.

EXAMPLE 1

This example is directed to a preferred method of forming a relatively stable slip of silicon metal particles and yttrium containing particles. The method is characterized in that in has the following steps.

A casting slip of silicon metal particles is formed in water. Preferably the silicon metal particles used have a size range of less than 10 microns. The silicon metal particles are dispersed in water to form the casting slip by use of a dispersing agent such as monoethanolamine. Normally the silicon metal particles form approximately 88% by weight of the material dispersed in the water. However, the silicon metal particles may form 95.5–77% by weight of the total weight of the particles dispersed in the water. In general, for every 100 parts by weight of dispersed particles there is about 40–45 parts by weight of water to form the casting slip.

Particles of a yttrium containing sintering aid are added to the casting slip. In the preferred embodiment, the particles of yttrium containing sintering aid are a compound which has at least some solubility in water to form $Y^{+3}$ ions. The yttrium containing sintering aid has a size range of less than about five microns and normally makes up about 12% by weight of the weight of the particles dispersed in the water. However, the yttrium containing sintering aid may make up 4.5–23% by weight of the particles dispersed in the water. A preferred yttrium containing sintering aid is yttrium oxide.

The $Y^{+3}$ ions produced by the yttrium containing sintering aid dissolving in water have a high potential for totally flocculating the silicon metal particles of the slip into a semiporous solid. By this we mean that for slip compositions which we make, if the composition is allowed to stand for a period of time, generally from about 30 minutes to one hour, the yttrium sintering aid will dissolve enough $Y^{+3}$ ions into the water to cause a flocculation of the silicon metal particles into a semiporous solid. In essence, the casting slip sets up into a semiporous material and is thereby ruined. In other words, the casting slip is no good for carrying out a slip casting operation.

In order to prevent the flocculation of the silicon metal particles by the $Y^{+3}$ ions, we have found that if a small amount of a fluoride salt is added to the casting slip, the $Y^{+3}$ ions are rendered ineffective in flocculating the silicon metal particles. By this we mean that the silicon metal particles as well as particles of the yttrium containing sintering aid remain in suspension in the casting slip and the casting slip has an increased shelf life. The casting slip may, for example, have no changes in its chemical or rheological stability for up to 350 hours or more, which is a very good shelf life for such a casting slip.

Preferably we desire to use a monovalent cation for the fluoride salt such as ammonia or sodium. Divalent and trivalent cations may be used, but they are not as effective in suppressing the flocculation by the $Y^{+3}$ ions as is the monovalent cation fluoride salt. Normally the fluoride salt is used in an amount of 0.01–0.25% by weight of the total weight of particles in suspension.

Normally the pH of the casting slip is in a range of 7.5–9. The pH of the casting slip is maintained in this range by the addition of acid or base, if required. By maintaining the pH, the extended shelf life of the casting slip is guaranteed. The casting slip of this invention can be used in a slip casting operation to produce a slip cast part having a relatively thick cross-section.

We do not know exactly the mechanism by which the small amount of fluoride salt is effective to suppress the flocculation of the silicon particles, but we believe that the principal mechanism is one in which $YF_3$ is formed on the surfaces of individual particles of the yttrium compound thus inhibiting the formation of $Y^{+3}$ ions in the water.

EXAMPLE 2

This example is directed to a method of forming a relatively stable casting slip of silicon metal particles and yttrium containing particles, and is characterized in the following steps.

Basically the same general operating parameters as discussed in Example 1 are in effect in this example.

A casting slip of silicon metal particles is formed in water as described in Example 1. In this example, however, a small amount of fluoride salt is added to the casting slip prior to the addition thereof of the yttrium containing sintering aid. The amount and purpose of the fluoride salt is the same as discussed in Example 1 with the monovalent fluoride salt being preferred.

Thereafter the yttrium containing sintering aid is added to the fluoride anion containing casting slip. As described above, the yttrium containing sintering aid is a compound which has at least some solubility in water to form $Y^{+3}$ ions. As mentioned above, $Y^{+3}$ ions have a high potential for totally flocculating the silicon metal particles into a semiporous solid. However the small amount of the fluoride anions is effective to suppress the flocculation of the silicon metal particles so that the silicon metal particles as well as the particles of the yttrium containing sintering aid remain in suspension.

Since all of the particles remain in suspension, the casting slip has both an increased shelf life and can be used to cast lip cast parts of relatively thick dimension. The pH of the casting slip is maintained in a range from 7.5 to 9.

EXAMPLE 3

This example is directed to a method of forming a relatively stable casting slip of silicon metal particles and yttrium containing particles, and is characterized in the following steps.

Basically the same general operating parameters as discussed in Example 1 are in effect in this example.

A casting slip of silicon metal particles is formed in water as described in Example 1.

In this example, however, a small amount of fluoride salt is added to a solution containing the yttrium containing sintering aid. The amount and purpose of the fluoride salt is the same as discussed in Example 1 with the monovalent fluoride salt being preferred.

The solution of the yttrium containing sintering aid having the fluoride anion therein is then added to the casting slip. As described above, the yttrium containing sintering aid is a compound which has at least some solubility in water to form $Y^{+3}$ ions. As mentioned above, $Y^{+3}$ ions have a high potential for totally flocculating the silicon metal particles into a semiporous solid. However, the small amount of the fluoride anions is effective to suppress the flocculation of the silicon metal particles so that the silicon metal particles as well as the particles of the yttrium containing sintering aid remain in suspension. Since all of the particles remain in suspension, the casting slip has both an increased shelf life and can be used to cast slip cast parts of relatively thick dimension. The pH of the casting slip is maintained in a range from 7.5 to 9.

While particular embodiments of the invention have been illustrated and described, it will be obvious to those skilled in the art that various changes and modifications may be made without departing from the invention, and it is intended in the appended claims all such modifications and equivalents as fall within the true spirit and scope of this invention.

We claim:

1. A method of forming a relatively stable slip of silicon metal particles and yttrium containing particles, characterized by the steps of:
    forming a casting slip of silicon metal particles in water;
    adding to said casting slip particles of a yttrium containing sintering aid, said yttrium containing sintering aid being a compound which has at least some solubility in water to form $Y^{+3}$ ions which have a high potential for totally flocculating said silicon metal particles into a semiporous solid;
    adding to said casting slip which contains said yttrium containing sintering aid a small amount of a fluoride salt which will produce fluoride anions when dissolved in water, said small amount of said fluoride anions being effective to suppress the flocculation of said silicon metal particles by said $Y^{+3}$ ions so that said silicon metal particles as well as said particles of said yttrium containing sintering aid remain in suspension in said casting slip and said casting slip has an increased shelf life; and
    maintaining the pH of said casting slip in a range from 7.5 to 9.

2. The method of claim 1, in which said fluoride salt is one based on a monovalent cation.

3. The method of claim 1, wherein said silicon metal particles have a size range less than 10 microns, wherein said silicon metal particles make up 95.5–77% by weight of the total weight of the particles in suspension, wherein said yttrium compound has a size range less than five microns, and wherein said fluoride salt is in an amount of 0.01–0.25% by weight of the total weight of the particles in suspension.

4. The method of claim 2, wherein said silicon metal particles have a size range less than 10 microns, wherein said silicon metal particles make up 95.5–77% weight of the total weight of the particles in suspension, wherein said yttrium compound has a size range less than five microns, and wherein said fluoride salt is in an amount of 0.01–0.25% by weight of the total weight of the particles in suspension.

5. A method of forming a relatively stable slip of silicon metal particles and yttrium containing particles, characterized by the steps of:
    forming a casting slip of silicon metal particles in water;
    adding to said casting slip a small amount of a fluoride salt which will produce fluoride anions when dissolved in water;
    adding to said fluoride anion containing casting slip particles of a yttrium containing sintering aid, said yttrium containing sintering aid being a compound which has at least some solubility in water to form $Y^{+3}$ ions which have a high potential for totally flocculating said silicon metal particles into a semiporous solid, said small amount of said fluoride anions being effective to suppress the flocculation of said silicon metal particles by said $Y^{+3}$ ions so that said silicon metal particles as well as said particles of said yttrium containing sintering aid remain in suspension in said casting slip and said casting slip has an increased shelf life; and
    maintaining the pH of said casting slip in a range from 7.5 to 9.

6. The method of claim 5, in which said fluoride salt is one based on a monovalent cation.

7. The method of claim 5, wherein said silicon metal particles have a size range less than 10 microns, wherein said silicon metal particles make up 95.5–77% by weight of the total weight of the particles in suspension, wherein said yttrium compound has a size range less than five microns, and wherein said fluoride salt is in an amount of 0.01–0.25% by weight of the total weight of the particles in suspension.

8. The method of claim 6, wherein said silicon metal particles have a size range less than 10 microns, wherein said silicon metal particles make up 95.5–77% by weight of the total weight of the particles in suspension, wherein said yttrium compound has a size range less than five microns, and wherein said fluoride salt is in an amount of 0.01–0.25% by weight of the total weight of the particles in suspension.

9. A method of forming a relatively stable slip of silicon metal particles and yttrium containing particles, characterized by the steps of:
    forming a casting slip of silicon metal particles in water;
    adding to a solution of particles of a yttrium containing sintering aid a small amount of a fluoride salt which will produce fluoride anions when dissolved in water;

adding to said casting slip said solution of said particles of a yttrium containing sintering aid having said fluoride salt therein, said yttrium containing sintering aid being a compound which has at least some solubility in water to form $Y^{+3}$ ions which have a high potential for totally flocculating said silicon metal particles into a semiporous solid, said small amount of said fluoride anions being effective to suppress the flocculation of said silicon metal particles by said $Y^{+3}$ ions so that said silicon metal particles as well as said particles of said yttrium containing sintering aid remain in suspension in said casting slip and said casting slip has an increased shelf life; and maintaining the pH of said casting slip in a range from 7.5 to 9.

10. The method of claim 9, in which said fluoride salt is one based on a monovalent cation.

11. The method of claim 9, wherein said silicon metal particles have a size range less than 10 microns, wherein said silicon metal particles make up 95.5–77% by weight of the total weight of the particles in suspension, wherein said yttrium compound has a size range less than five microns, and wherein said fluoride salt is in an amount of 0.01–0.25% by weight of the total weight of the particles in suspension.

12. The method of claim 10, wherein said silicon metal particles have a size range less than 10 microns, wherein said silicon metal particles make up 95.5–77% by weight of the total weight of the particles in suspension, wherein said yttrium compound has a size range less than five microns, and wherein said fluoride salt is in an amount of 0.01–0.25% by weight of the total weight of the particles in suspension.

* * * * *